United States Patent
Mikuriya et al.

(10) Patent No.: US 7,283,306 B2
(45) Date of Patent: Oct. 16, 2007

(54) CONFOCAL OPTICAL SCANNER

(75) Inventors: Kenta Mikuriya, Musashino (JP); Takeo Tanaami, Musashino (JP); Naoki Seki, Musashino (JP); Takeharu Nagai, Itabashi (JP); Atsushi Miyawaki, Wakou (JP)

(73) Assignees: Riken, Wako (JP); Yokogawa Electric Corporation, Tokyo (JP)

( * ) Notice: Subject to any disclaimer, the term of this patent is extended or adjusted under 35 U.S.C. 154(b) by 127 days.

(21) Appl. No.: 10/844,421

(22) Filed: May 13, 2004

(65) Prior Publication Data
US 2004/0262506 A1 Dec. 30, 2004

(30) Foreign Application Priority Data
May 14, 2003 (JP) .............................. 2003-135591

(51) Int. Cl.
G02B 27/14 (2006.01)
G02B 21/00 (2006.01)
G02B 26/02 (2006.01)

(52) U.S. Cl. ...................... 359/634; 359/234; 359/368

(58) Field of Classification Search ........ 359/368–390, 359/359–361, 634–637, 227–236
See application file for complete search history.

(56) References Cited

U.S. PATENT DOCUMENTS

| 5,633,751 | A | 5/1997 | Tanaami et al. ............. 359/368 |
| 5,760,950 | A | 6/1998 | Maly et al. .................. 359/368 |
| 5,969,846 | A * | 10/1999 | Kishi .......................... 359/227 |
| 6,147,798 | A | 11/2000 | Brooker et al. ............. 359/368 |
| 6,147,800 | A * | 11/2000 | Faber .......................... 359/389 |
| 6,252,664 | B1 * | 6/2001 | Barbera-Guillem ......... 356/417 |
| 6,534,903 | B1 * | 3/2003 | Spiro et al. ................. 313/113 |

FOREIGN PATENT DOCUMENTS

DE 10004191 A1 12/2000
EP 1 168 029 A2 1/2002

OTHER PUBLICATIONS

C. Genka et al.; Visualization of biphasic $Ca^{2+}$ diffusion from cytosol to nucleus in contracting adult rat cardiac myocytes with an ultra-fast confocal imaging system; Harcourt Brace & Co. Ltd. 1999; Cell Calcium (1999) 25(3), pp. 199 & 201.
Coherent The Catalog for Laser and Photonics Applications 1998/99 Coherent Auburn Group Foreign communication (search report).

* cited by examiner

*Primary Examiner*—Thong Q Nguyen
(74) *Attorney, Agent, or Firm*—Westerman, Hattori, Daniels & Adrian, LLP.

(57) ABSTRACT

A confocal optical scanner of Nipkow disk type for measuring a sample, in which each component of two or more color pigments, has a high reflection mirror for separating an excited light to be radiated onto the sample and a fluorescence emitted from the sample, wherein a reflectance of the high reflection mirror is from 80% to 100% in a measured wavelength region including at least an excited light wavelength region and a fluorescence wavelength region. Thereby, the confocal optical scanner capable of measuring a polychromatic fluorescent image at the same time is realized with the enhanced light receiving efficiency of fluorescence, using one high reflection mirror without using a plurality of dichroic mirrors by exchange.

16 Claims, 7 Drawing Sheets clr-ECFP-KDEL coxIV-SE10C nls-dsRed merge

CONFOCAL OPTICAL SCANNER

BACKGROUND OF THE INVENTION

1. Field of the Invention

The present invention relates to an optical system in a confocal optical scanner, and particularly to improvements in a dichroic mirror for measuring a plurality of kinds of fluorescence (also referred to as a polychromatic fluorescence) emitted from a sample at the same time and enhancement of the fluorescence efficiency.

2. Description of the Related Art

Conventionally, a confocal optical scanner used with a microscope has been well known (e.g., refer to C. Genka, K. Ishida, K. Ichimori, Y. Hirota, T. Tanaami, H. Nakazawa, "Visualization of biphasic $Ca^{2+}$ diffusion from cytosol to nucleus in contracting adult rat cardiac myocytes with an ultra-fast confocal imaging system", Cell Calcium, Volume 25, Issue 3, P. 199-208). FIG. 1 is a schematic diagram of the principle of the confocal optical scanner of this kind. A laser 1 as an excited light is converged into individual light fluxes by each microlens 3 disposed on a microlens disk 2, transmitted through a multi-chroic mirror (hereinafter referred to as a multi-wavelength dichroic mirror, though it should be essentially called multi-chroic mirror) 4, and then passed through individual pinholes 6 provided on a pinhole disk (also called a Nipkow disk) 5 to be converged by an objective lens 7 onto a sample 8.

Fluorescence emitted from the sample 8 is passed through the objective lens 7 again and converged into individual pinholes on the pinhole disk 5. Fluorescence passed through individual pinholes 6 is reflected by the multi-wavelength dichroic mirror 4, and passed through a relay lens 9 to form a fluorescent image on a sensor 10.

The multi-wavelength dichroic mirror 4 used herein is designed to pass excited light 1 and to reflect fluorescence from the sample 8.

The microlens disk 2 and the pinhole disk 5 are mechanically coupled through a member 11, and integrally rotate around an axis of rotation 12. Individual microlenses 3 and pinholes 6 are disposed so that excited light from individual pinholes 6 formed on the pinhole disk 5 scans over an observation plane of the sample 8. Since a plane where the pinholes 6 are arranged, the observation plane of the sample 8, and a light receiving plane of the sensor 10 are respectively disposed in optically conjugate relation, an optically sectional image of the sample 8, that is, a confocal image is imaged on the sensor 10.

In such a confocal optical scanner, the multi-wavelength dichroic mirror 4 for measuring the multiple wavelengths at the same time is employed. The characteristic of the multi-wavelength dichroic mirror 4 is as shown in FIG. 2A, for example. The corresponding characteristic, that is, the wavelength characteristic of fluorescence emitted from the sample 8 is as shown in FIG. 2B.

In the conventional confocal optical scanner, the multi-wavelength dichroic mirror 4 is employed. The multi-wavelength dichroic mirror 4 passes the excited light of a wavelength band with low reflectance, and reflects fluorescence from the sample 8 of a wavelength band with high reflectance to lead it to the sensor 10.

When a single wavelength dichroic mirror is employed, it is required that three dichroic mirrors having different characteristics are mechanically switched. However, when the multi-wavelength dichroic mirror is employed, there is the advantage that polychromatic fluorescent images can be measured at the same time without exchanging and switching the dichroic mirrors.

However, the conventional confocal optical scanner has the following problems.

(1) This multi-wavelength dichroic mirror cannot reflect a considerable part of proper fluorescence emitted from the sample.

For example, cyan fluorescent labeled protein ECFP, yellow fluorescent labeled protein EYFP, red fluorescent protein DsRed are considered regarding the expression vector as follows.

(a) For ECFP, about 60% on the side of the longer wavelength than 480 nm is cut.

(b) For EYFP, about 30% on the side of the longer wavelength than 560 nm is cut.

(c) For DsRed, about 60% on the side of the shorter wavelength than 600 nm including peaks is cut.

The efficiency is very bad with the characteristic of such a multi-wavelength dichroic mirror, so that the obtained fluorescent image is dark, and the S/N ratio is low.

(2) A dedicated filter is required for each kind of fluorescent reagent.

As shown in FIG. 2B, the wavelength characteristic of fluorescent reagent vary from one reagent to another. Further, the corresponding multi-wavelength dichroic mirror must be designed and prepared for each combination thereof. It is undesirable in respects of cost, inventory, exchange time and contamination at exchange time. Also, when the filter is exchanged, a large image deviation may occur as a significant problem when the superposed image is observed.

(3) When the transmitted image or the inverted fluorescent image of blue nucleus staining with 4',6-diamidino-2-phenylindole, dihydrochioride (Dapi) color pigment is superposed on the confocal fluorescent image to be measured, a blue image, as indicated by the one dot chain line in FIG. 2A, of the transmitted image or the inverted fluorescent image is cut by the multi-wavelength dichroic mirror. Therefore, the correct measurement is not allowed, and the superposed image is dark.

SUMMARY OF THE INVENTION

An object of the invention is to provide a confocal optical scanner using one high reflection mirror, without using a plurality of dichroic mirrors by exchange, in which a polychromatic fluorescent image is measured at the same time and the light receiving efficiency of fluorescence is enhanced.

DETAILED DESCRIPTION OF THE PREFERRED EMBODIMENTS

The present invention will be described in detail with reference to the accompanying drawings.

Figure 1:
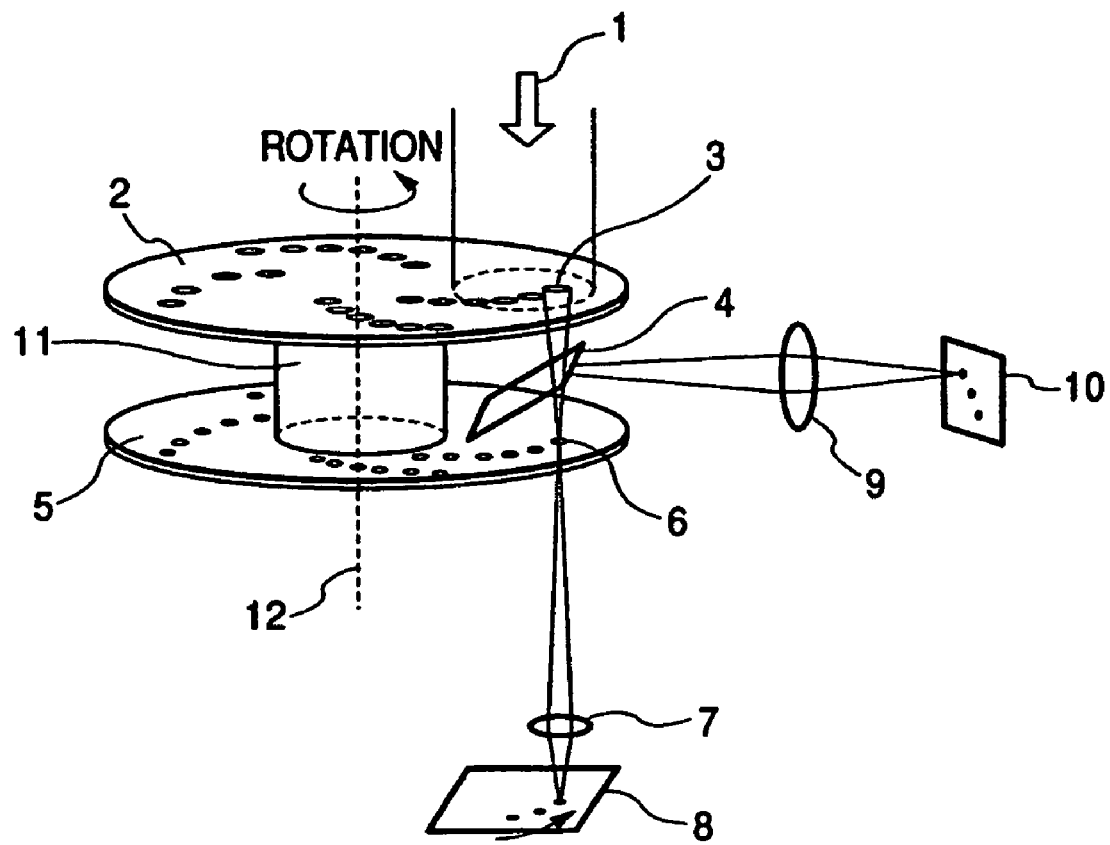
FIG. 1 is a schematic diagram showing one example of the conventional confocal optical scanner.
Figure 3:
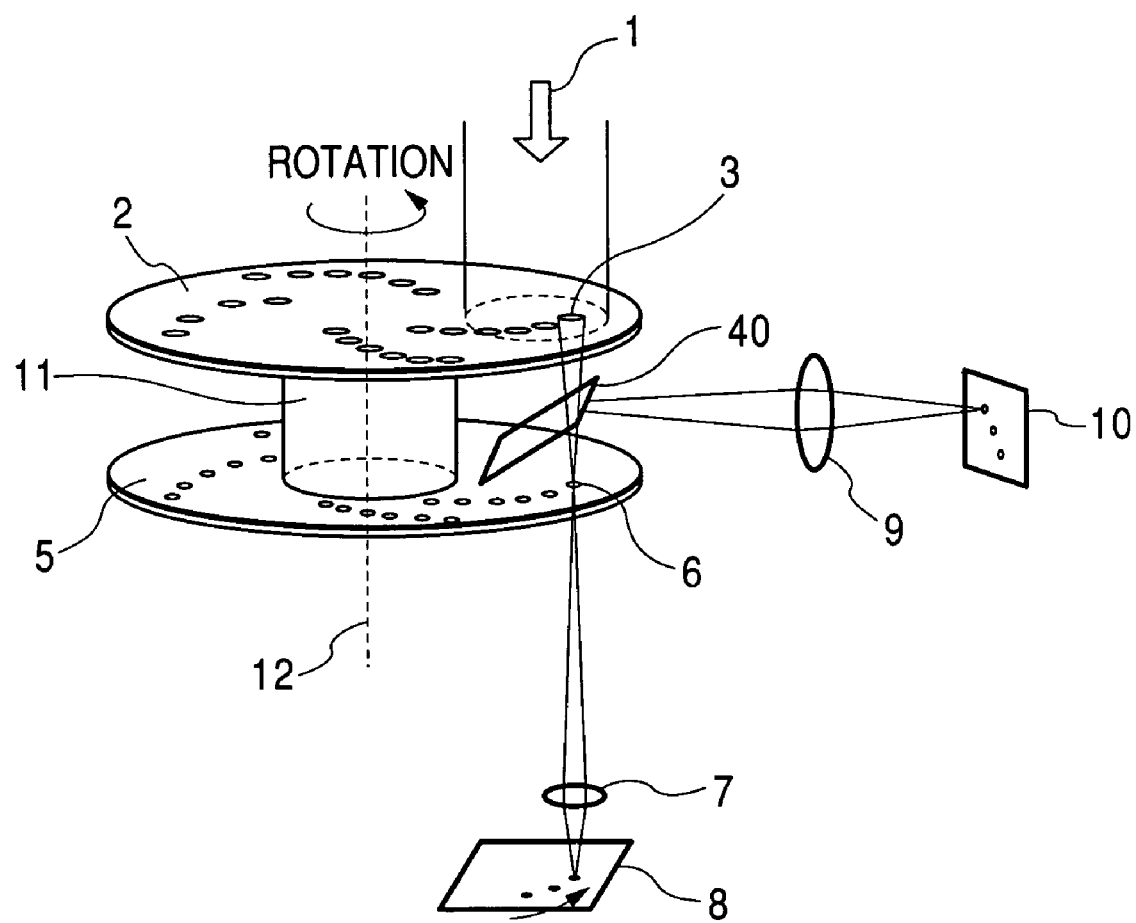
FIG. 3 is a schematic diagram showing an embodiment of a confocal optical scanner according to this invention.

FIG. 3 is a schematic diagram showing an embodiment of a confocal optical scanner according to the invention. In FIG. 3, the same or like elements are designated by the same numerals as in FIG. 1, and not described here. A point different from FIG. 1 is a high reflection mirror 40.

Figure 4:
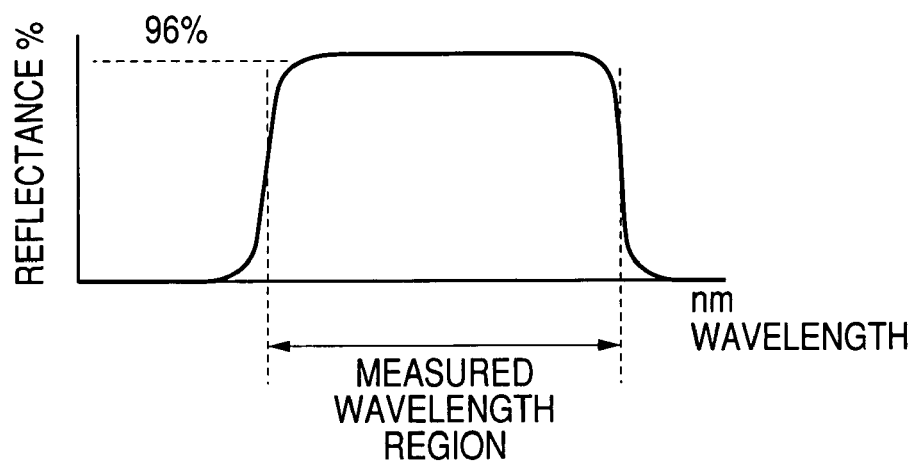
FIG. 4 is a characteristic view of a high reflection mirror of the invention.

A reflectance of the high reflection mirror 40 is about 96% over the entire wavelength region (measured wavelength region) used, as shown in FIG. 4. The measured wavelength region consists of an excited light wavelength region and a fluorescent wavelength region. Moreover, the measured wavelength region may include a wavelength region of transmitted or inverted fluorescent image.

Figure 5:
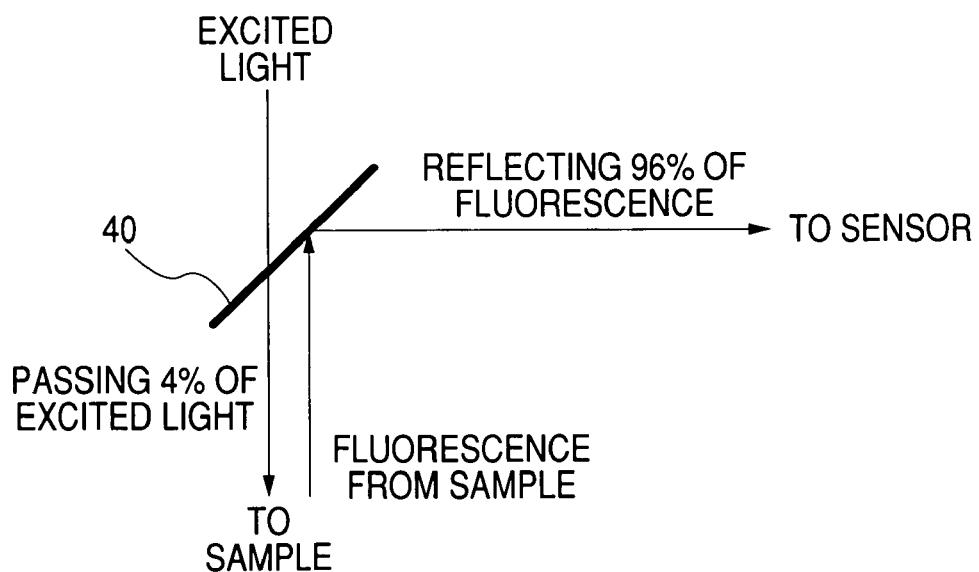
FIG. 5 is a diagram for explaining the transmittance and the reflectance of the high reflection mirror.

According to the high reflection mirror, 4% of an excited light 1 passes through the high reflection mirror 40 to be radiated onto a sample 8. On the other hand, 96% of a fluorescence from the sample 8 is reflected from the high reflection mirror 40, as shown in FIG. 5.

Since the reflection does not depend on the wavelength, a loss by the high reflection mirror 40 is only 4%.

Though the use efficiency of excited light is worse, the relationship (so-called efficiency) between the quantity of radiation for excitation of the sample of essential importance and the quantity of fluorescence emitted from the sample is not related with the worse use efficiency at all.

The Ar laser having an emission power of 50 mW from the main body is employed as an exciting laser employed usually because it is readily available. However, since the sample 8 is damaged with this power, the power is often attenuated into 1/10 to 1/20, with using an ND filter. In this case, only 5 to 10% of the power of the laser main body is employed.

Accordingly, the high reflection mirror 40 is only employed to apply an appropriate light of excited light on the sample with its transmittance of 4% without using the ND filter to attenuate the laser power in the embodiment.

Figure 6A:
FIGS. 6A and 6B show the comparisons of measured images by the conventional confocal optical scanner and the confocal optical scanner of the invention.
Figure 6B:
Figure 7:
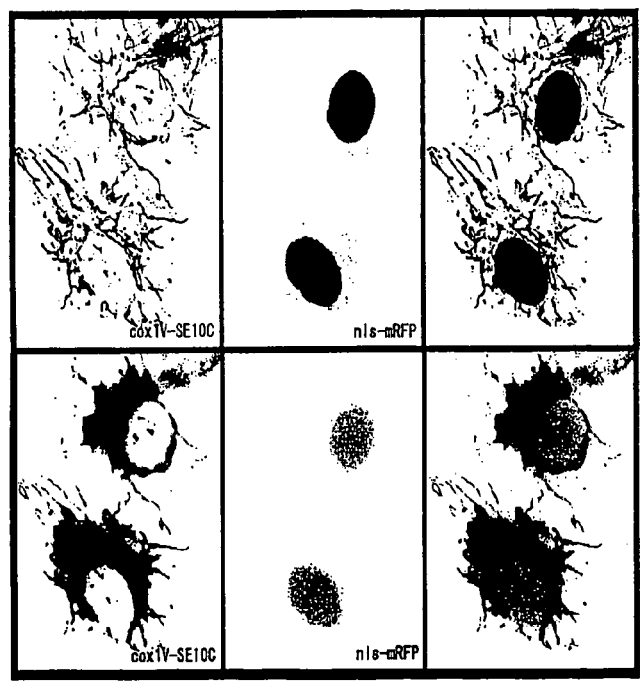
FIG. 7 shows the comparisons of another measured images by the conventional inverted microscope and the confocal optical scanner of the invention.

Actual observed images are shown in FIGS. 6 to 8. FIG. 6 is a view showing images with the position changed in optical axis direction every 0.5 μm by introducing yellow variant Venus of Green Fluorescent Protein (GFP) into HeLa cell and exciting it with laser. For the sake of convenience, the image is binarized. FIG. 6A shows the measured images with the conventional multi-wavelength mirror 4. FIG. 6B shows the measured images with the high reflection mirror 40 of the invention. Both of the measured images are excellently matched to assure the practicality of the confocal optical scanner of the embodiment.

FIG. 7 shows the images of cells. For the sake of convenience, the image is binarized in the figure. The upper stage shows the measured images with the high reflection mirror 40 of the embodiment, and the lower stage shows the measured images with the ordinary inverted fluorescence microscope. At the upper and lower stages, a mitochondria image (green) with cytochrome oxidase subunit IV-super enhanced yellow fluorescent protein (coxIV-SEYFP) is illustrated on the left side, and a nucleus image (red) with nls-mRFP in the center, and a synthetic image of the left image and the central image on the right side.

In FIG. 7, the intracellular minute organ is clearly distinguished by each color. It can be found that the confocal optical scanner of the invention produces sharper images by slicing the image at confocal point than the inverted fluorescence microscope.

Figure 8A:
FIGS. 8A to 8D are views showing the measured images of a unicell in three colors and its synthetic image.
Figure 8B:
Figure 8C:
Figure 8D:

FIGS. 8A to 8D show the synthetic image by measuring the unicell in three colors and superimposing the color images. For the sake of convenience, the image is binarized in the figure. FIG. 8A shows an endoplasmic reticulum membrane image (light blue) with sarco-endoplasmic reticulum $Ca^{2+}$-ATPase-enhanced cyan fluorescent protein (SERCA-ECFP), FIG. 8B shows an mitochondria image (yellow) with coxIV-SEYFP, FIG. 8C shows a nucleus and nucleolus image (red) with nuclear localization signal-dsRed (nls-dsRed), and FIG. 8D shows a synthetic image of the above three images.

In this manner, the intracellular minute organ is clearly distinguished by polychromatic measurement of the embodiment.

This invention is not limited to the above embodiment, but various variations or modifications may be made without departing from the scope or spirit of the invention.

For example, the reflectance of the high reflection mirror 40 is not 96%, but may be from about 80 to 99% to achieve the sufficient effects, as shown in FIG. 4.

Figure 2A:
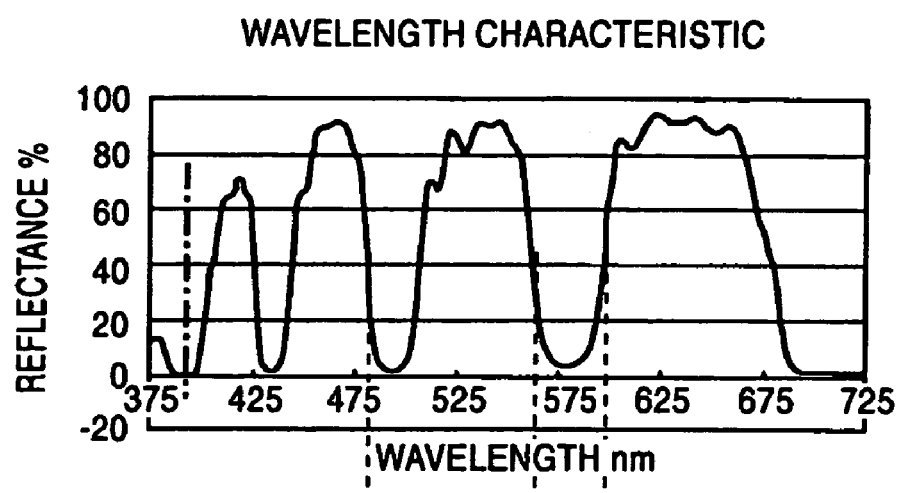
FIGS. 2A and 2B are views showing the characteristics of the conventional multi-wavelength dichroic mirror and the wavelength characteristics of fluorescence from the sample.
Figure 2B:
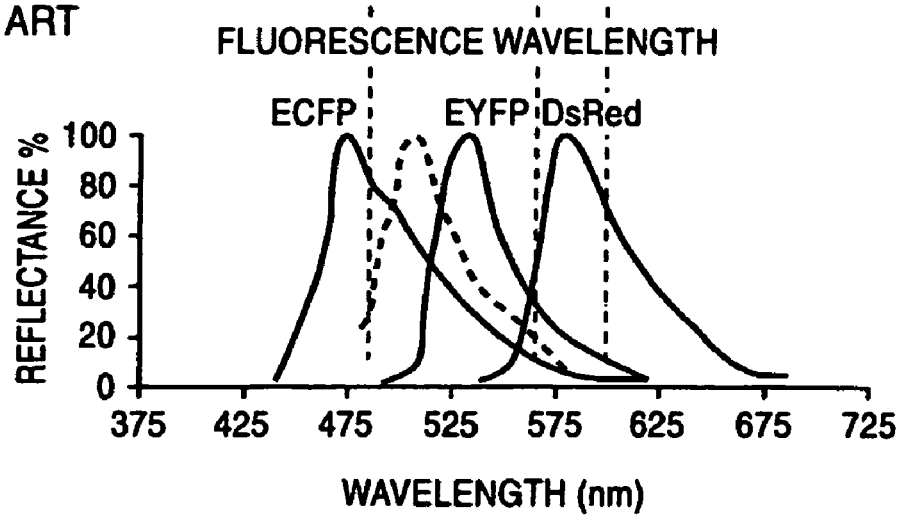

Also, the wavelength region is not only the visible area as shown in FIGS. 4 and 2A, but also may be ultraviolet or near infrared.

Figure 9:
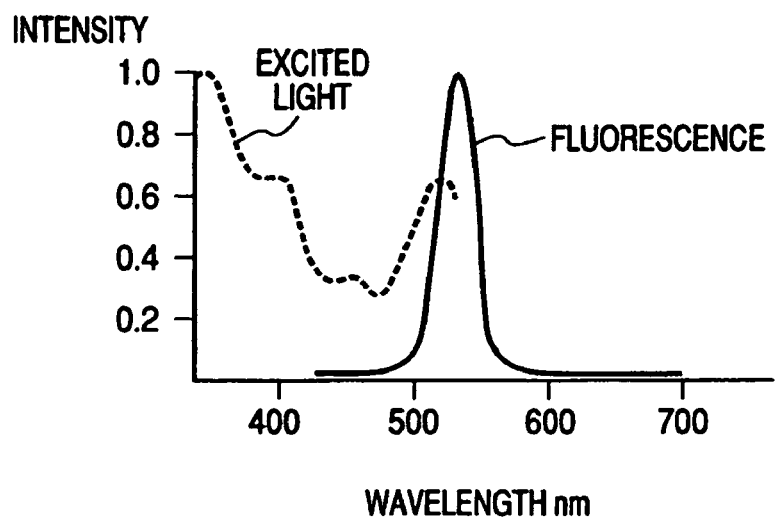
FIG. 9 is a diagram showing the spectrum of a quantum dot at the fluorescent wavelength.
Figure 10:
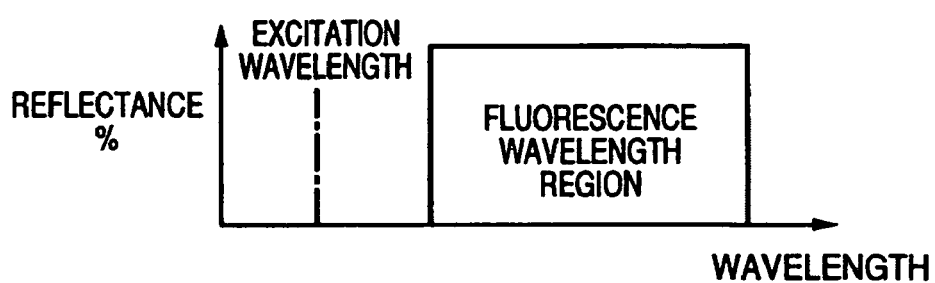
FIG. 10 is a diagram showing the wavelength region of an excited light in the case of a quantum dot fluorescent reagent.

Also, in the quantum dot excitation or multiple photon excitation, the excited light wavelength region and the fluorescence wavelength region may be greatly different. The quantum dot is nano-crystal composed of semiconductor device having a diameter of several nm, and has the characteristic that as the size of grain is smaller, the fluorescence wavelength is shorter. And the wavelength spectrum is narrow, and symmetrical, as shown in FIG. 9. In the case of a quantum dot type fluorescent reagent, the excited light has higher excitation efficiency on the shorter wavelength side, as shown in FIG. 10.

Figure 11:
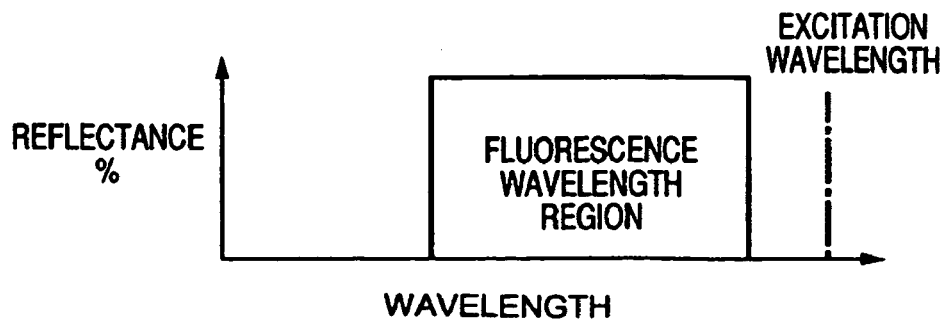
FIG. 11 is a diagram showing the wavelength region of an excited light in the case of a multiple photon excitation.

Also, in the case of a multiple photon excitation, the excited light has double the normal wavelength, and may appear on the longer wavelength side from the fluorescence wavelength region, as shown in FIG. 11.

In the case of this quantum dot and multiple photon excitation, the reflectance may be 100% (or substantially 100%) in the fluorescence wavelength region. Also, the wavelength region of excited light, the reflectance may be substantially 20% or less to be sufficiently usable (transmittance is substantially 80% or more).

According to the confocal optical scanner of the above embodiment, the following effects occur.

(1) The light receiving efficiency of fluorescence is greatly improved while there is the advantage that the polychromatic image is measured at the same time with one high reflection mirror 40 without exchange.

(2) No dedicated filter is required for each kind of fluorescent reagent. This is very favorable in respects of cost, inventory, exchange time and contamination at exchange time. Since the high reflection mirror 40 is unnecessary to exchange, there is no problem with image deviation in the polychromatic image caused by a mounting angle or plate thickness when the dichroic mirror is exchanged.

(3) It is very favorable particularly that the image deviation does not occur, and any wavelength is observed, in the superposition of fluorescent images or transmitted light image. For example, conventionally, if the inverted UV fluorescent observed images (blue to green) are observed employing the blue excited dichroic mirror, light of about 510 nm or more (green) is only visible. However, employing the high reflection mirror 40 of the invention, light (green) from 400 nm (blue) to about 510 nm or more (green) can be measured in combination with an appropriate barrier filter, whereby the correct and bright superposed image is obtained (the wavelength region as indicated by the one dot chain line in FIG. 2A is also measurable).

What is claimed is:

1. A confocal optical scanner of Nipkow disk type for measuring a sample in which each component of two or more color pigments are distinguishable, comprising:
    a high reflection mirror for separating an excited light to be radiated onto said sample and a fluorescence emitted from said sample,
    wherein a reflectance of said high reflection mirror is from 80% to 100% at all wavelengths in a measured wavelength region including at least an excited light wavelength region and a fluorescence wavelength region.

2. The confocal optical scanner according to claim 1, wherein said measured wavelength region includes said excited light wavelength region, said fluorescence wavelength region, and a wavelength region of a transmitted or inverted fluorescent image to be superposed on a fluorescent image.

3. The confocal optical scanner according to claim 2, wherein said fluorescence wavelength region is an ultraviolet area, a visible light area, a near infrared area, or an infrared area.

4. The confocal optical scanner according to claim 3, wherein a fluorescence reflectance in said fluorescence wavelength region is 100% when said excited light is multiple photon excitation.

5. The confocal optical scanner according to claim 4, wherein the fluorescence reflectance in said fluorescence wavelength region is 100% when a fluorescent reagent added to said sample is quantum dot.

6. The confocal optical scanner according to claim 3, wherein the fluorescence reflectance in said fluorescence wavelength region is 100% when a fluorescent reagent added to said sample is quantum dot.

7. The confocal optical scanner according to claim 2, wherein a fluorescence reflectance in said fluorescence wavelength region is 100% when said excited light is multiple photon excitation.

8. The confocal optical scanner according to claim 7, wherein the fluorescence reflectance in said fluorescence wavelength region is 100% when a fluorescent reagent added to said sample is quantum dot.

9. The confocal optical scanner according to claim 2, wherein the fluorescence reflectance in said fluorescence wavelength region is 100% when a fluorescent reagent added to said sample is quantum dot.

10. The confocal optical scanner according to claim 1, wherein said fluorescence wavelength region is an ultraviolet area, a visible light area, a near infrared area, or an infrared area.

11. The confocal optical scanner according to claim 10, wherein a fluorescence reflectance in said fluorescence wavelength region is 100% when said excited light is multiple photon excitation.

12. The confocal optical scanner according to claim 11, wherein the fluorescence reflectance in said fluorescence wavelength region is 100% when a fluorescent reagent added to said sample is quantum dot.

13. The confocal optical scanner according to claim 10, wherein the fluorescence reflectance in said fluorescence wavelength region is 100% when a fluorescent reagent added to said sample is quantum dot.

14. The confocal optical scanner according to claim 1, wherein a fluorescence reflectance in said fluorescence wavelength region is 100% when said excited light is multiple photon excitation.

15. The confocal optical scanner according to claim 14, wherein the fluorescence reflectance in said fluorescence wavelength region is 100% when a fluorescent reagent added to said sample is quantum dot.

16. The confocal optical scanner according to claim 1, wherein the fluorescence reflectance in said fluorescence wavelength region is 100% when a fluorescent reagent added to said sample is quantum dot.

* * * * *